United States Patent [19]
Zenda

[11] Patent Number: 5,493,685
[45] Date of Patent: * Feb. 20, 1996

[54] DISPLAY CONTROL APPARATUS CAPABLE OF CHANGING LUMINANCE DEPENDING ON CONDITIONS OF POWER SUPPLY CIRCUIT

[75] Inventor: Hiroki Zenda, Tokyo, Japan

[73] Assignee: Kabushiki Kaisha Toshiba, Kawasaki, Japan

[*] Notice: The portion of the term of this patent subsequent to Jan. 31, 2012, has been disclaimed.

[21] Appl. No.: 315,499

[22] Filed: Sep. 30, 1994

Related U.S. Application Data

[63] Continuation of Ser. No. 109,476, Aug. 20, 1993, Pat. No. 5,386,577, which is a continuation of Ser. No. 578,247, Sep. 6, 1990, abandoned.

[30] Foreign Application Priority Data

Feb. 23, 1990 [JP] Japan ..................................... 2-40926

[51] Int. Cl.$^6$ ..................................... G06F 1/28
[52] U.S. Cl. ..................... 395/750; 364/707; 364/237.5; 364/DIG. 1
[58] Field of Search ..................... 395/750, 132; 364/707, 927.7, DIG. 2, 237.5, DIG. 1; 315/169.3, 169.4

[56] References Cited

U.S. PATENT DOCUMENTS

| 4,849,700 | 7/1989 | Morioka et al. | |
|---|---|---|---|
| 4,980,836 | 12/1990 | Carter et al. | 364/483 |
| 5,065,357 | 11/1991 | Shiraishi et al. | 395/200 |
| 5,184,117 | 2/1993 | Gauthier | 340/784 |
| 5,315,695 | 5/1994 | Saito et al. | 395/132 |
| 5,386,577 | 1/1995 | Zenda | 395/750 |

FOREIGN PATENT DOCUMENTS

| 0211308 | 2/1987 | European Pat. Off. . |
|---|---|---|
| 54-081022 | 6/1979 | Japan . |
| 59-147469 | 5/1986 | Japan . |
| 60-216446 | 4/1987 | Japan . |

OTHER PUBLICATIONS

European Search Report dated Dec. 1, 1992 and citing two references.

Primary Examiner—Glenn A. Auve
Attorney, Agent, or Firm—Finnegan, Henderson, Farabow, Garrett & Dunner

[57] ABSTRACT

In a portable personal computer having a flat panel display and driven by battery or by AC adapter, a LOW battery state of battery is detected. In response to the low battery state, a luminance control signal having a minimum luminance value is supplied to the flat panel display. When the personal computer is driven by the AC adapter, a luminance control signal having a maximum luminance value is supplied to the flat panel display.

8 Claims, 3 Drawing Sheets

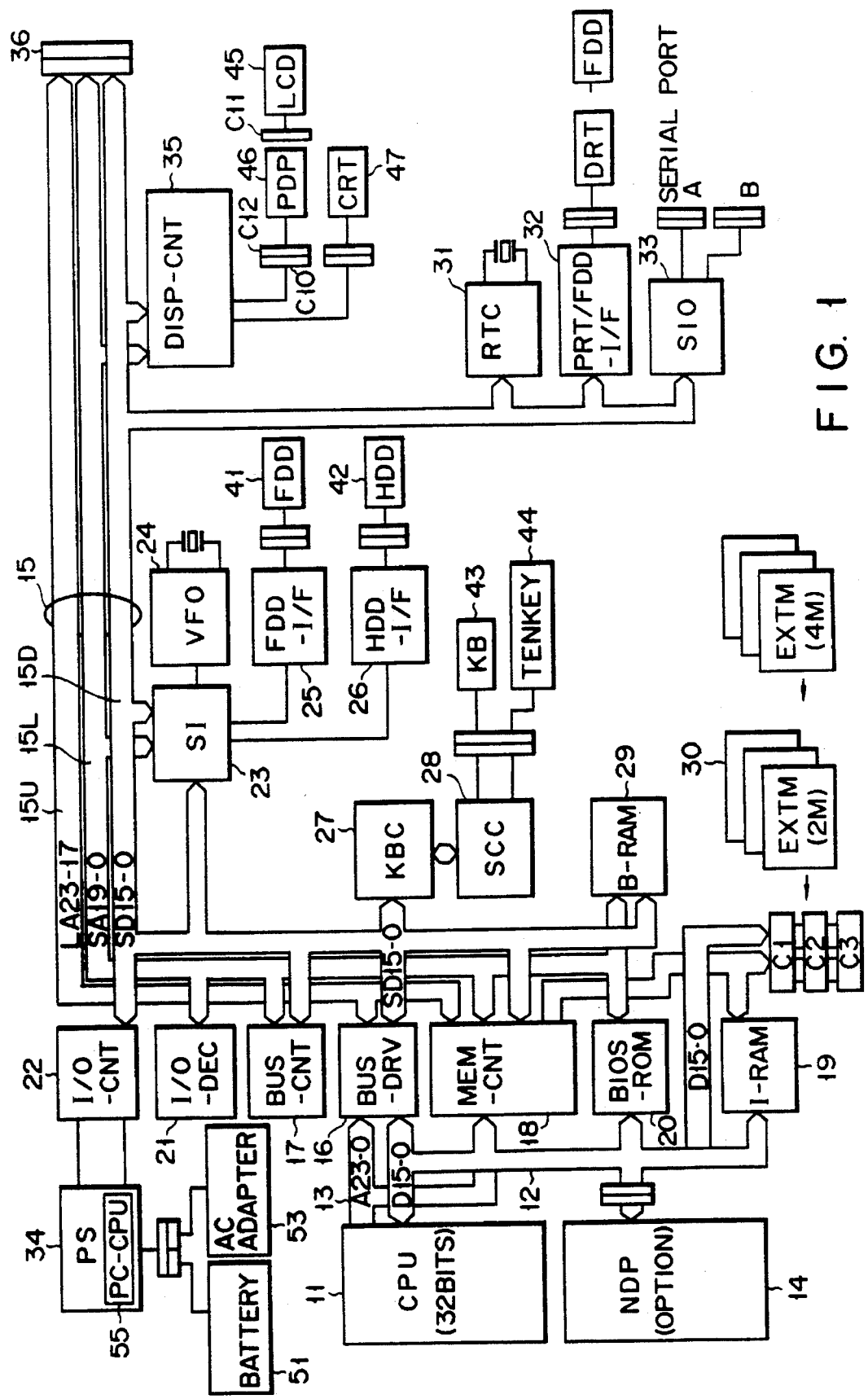
F I G. 1

DISPLAY CONTROL APPARATUS CAPABLE OF CHANGING LUMINANCE DEPENDING ON CONDITIONS OF POWER SUPPLY CIRCUIT

This is a continuation under 37 C.F.R. § 160 of prior application Ser. No. 08/109,476, filed Aug. 20, 1993 and now U.S. Pat. No. 5,385,577, which is a continuation application of Ser. No. 07/578,247, filed Sep. 6, 1990 and now abandoned.

BACKGROUND OF THE INVENTION

1. Field of the Invention

This invention relates to a luminance control apparatus suitable for a personal computer using as a display unit a flat type panel display unit such as a liquid crystal display (LCD) panel and a plasma display panel (PDP), and more particularly, for a battery driven portable personal computer.

2. Description of the Related Art

In a field of personal computers, small-sized, light-weighted, and portable lap-top type computer have become spread instead of a conventional desk top type computers. Such personal computers use a flat panel type display such as LCD and PDP. Most of such computers are driven by battery.

For the above panel display unit, power dissipation is changed depending on the display luminance. The method of controlling the luminance of the display device by directly or indirectly detecting the dissipated power or the heat produced by the power dissipation has been proposed by the same assignee as that of the present invention and is laid open to the public (Patent Application No. 60-216446).

Generally, a display is performed by converting an energy in a form of luminance. Thus, the power consumption is changed according to the luminance level, and heat is produced accordingly. The PDP is a display unit in which electrical discharge is directly viewed. For this reason, as the discharge energy, i.e., the dissipated power increases, the display luminance increases. The LCD is a display unit in which the liquid crystal serves as a shutter shielding the light generated by the backlight. Increased power of the backlight increases the luminance. Reflective type LCD is an exception in which the luminance is not directly related to the power consumption since reflection of the external light is used.

To restrain the heat production, the display luminance is controlled with power consumption detected as in the above proposal. For example, a DC type PDP is known which has a built-in type circuit for controlling the luminance to prevent a current of more than a certain quantity from flowing.

For the purpose of reducing heat, the existing circuit satisfactorily works, but in a battery-driven lap-top type personal computer, power consumption must be restrained not only for reducing heat dissipation but also for the purpose of prolonging the battery operation time.

However, as in the DC type PDP, a display unit incorporating the existing circuit for keeping the power dissipation under a certain level or less, cannot detect a condition under which a battery is used and the change of the residual capacity of the battery. For this reason, the power consumption and the display luminance are constant when the battery is not used with an AC adapter connected, or when the battery is used and the residual capacity is small. When an AC adapter is connected, the power dissipation of the battery need not be considered. For this reason, the maximum luminance could be obtained while limiting the heat to a certain level. In the DC type PDP, the power consumption is increased also by the size of display on the screen. However, during the use of battery with small residual capacity, if the power consumption is abruptly increased, such as when a reverse display is abruptly made, battery current abruptly flows. For this reason, the battery power is cutoff and the shutdown operation due to the battery cutoff may be performed in fail. Thus, there is a drawback that it is necessary to perform the shutdown operation earlier than necessary and thus the operation time is shortened.

As mentioned above, in a battery-driven type portable personal computer, the power consumption must be reduced to prolong the battery operation time. For this reason, in the display unit in which power consumption varies according to the display luminance, the display luminance must be controlled to be constrained to be lower than the conventional luminance control for constraining the heat, from a view point of detecting the power dissipation and controlling the display luminance.

As shown in Utility Model Application No. 59-147469 which has been filed by the same assignee, a system using a DC type PDP, is known having a micro computer in the conventional power supply device, for detecting the use and residual capacity of a battery in addition to the normal control such as control of the output voltage.

SUMMARY OF THE INVENTION

An object of the present invention is to provide a luminance control apparatus of a panel display which can change the method of controlling the display luminance depending upon the various conditions of the current circuits such as using condition of the battery and the variation of the residual capacity of the battery.

According to a first aspect of the invention, a flat panel display luminance control apparatus for a portable computer provided with a flat panel display unit for performing a display in response to a luminance control, and first and second power supply means selectively used for supplying power to the flat panel display unit, comprises: first means for determining whether a power supplement state of said first power supply means is normal; second means for determining whether said second power supply means is used; and luminance control means for supplying a first luminance control signal to the flat panel display unit when the power supplement state of said first power supply means determined to be not normal by said first means, and for supplying a second luminance control signal to the flat panel display unit when the second power supply means is determined by said second means as being used.

According to a second aspect of the invention, a flat panel display control apparatus for a portable personal computer provided with a flat panel display unit for performing a display in response to a luminance control signal and a battery for supplying power to the flat panel display unit, comprises: means for determining whether said battery is in a low battery state; and luminance control means for variably controlling the luminance control signal supplied to the flat panel display unit when the low battery is determined.

According to a third aspect of the invention, a luminance control method of a flat panel display unit in a personal computer provided with a flat panel display unit for performing a display in response to a luminance control signal and a power supply for supplying power to the flat panel display unit, comprises the steps of: detecting a low battery state when said power supply comprises a battery; and controlling the luminance control signal to low luminance, to be supplied to the flat panel display unit in response to the detection of the low battery state.

According to the present invention, the luminance control circuit which has been provided in the display unit is incorporated in the power supply unit. A microcomputer in the luminance control circuit detects the power consumption to control the display luminance and also detects the use and residual capacity of the battery to vary the luminance control method. During the use of the battery, the luminance is controlled to lower value to decrease the power consumption. When the AC adapter is connected, the power consumption of the battery need not be considered. For this reason, the luminance can be held to a maximum value as far as the heat does not exceed a certain level.

The consumed current is also increased by an amount of display in a screen. When the residual capacity is small during the use of the battery and when the power consumption is abruptly increased, for example, by an abrupt inversion of the display, the battery current flows abruptly and normal shut-down operation due to cutoff of battery power may be impossible. For this reason, when the residual capacity of the battery becomes less than a certain value, the display luminance is uniformly decreased to secure the current so that a shutdown operation (an operation treatment for storing the contents of various CPU registers, program counter, and the stack into the backup RAM) is possible even if an abrupt inversion display occurs. This avoids the battery operation time being shortened more than necessary.

Further according to the present invention, the control method of the display luminance can be changed by various conditions of the power supply circuit such as the use and the change of the residual capacity of the battery. Accordingly, unnecessary reduction of the display luminance can be avoided and the battery operation time can be prevented from being shortened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing an embodiment of portable personal computer to which a battery driver the display control unit according to the present invention is applied;

DETAILED DESCRIPTION OF THE PREFERRED EMBODIMENTS

Figure 2:
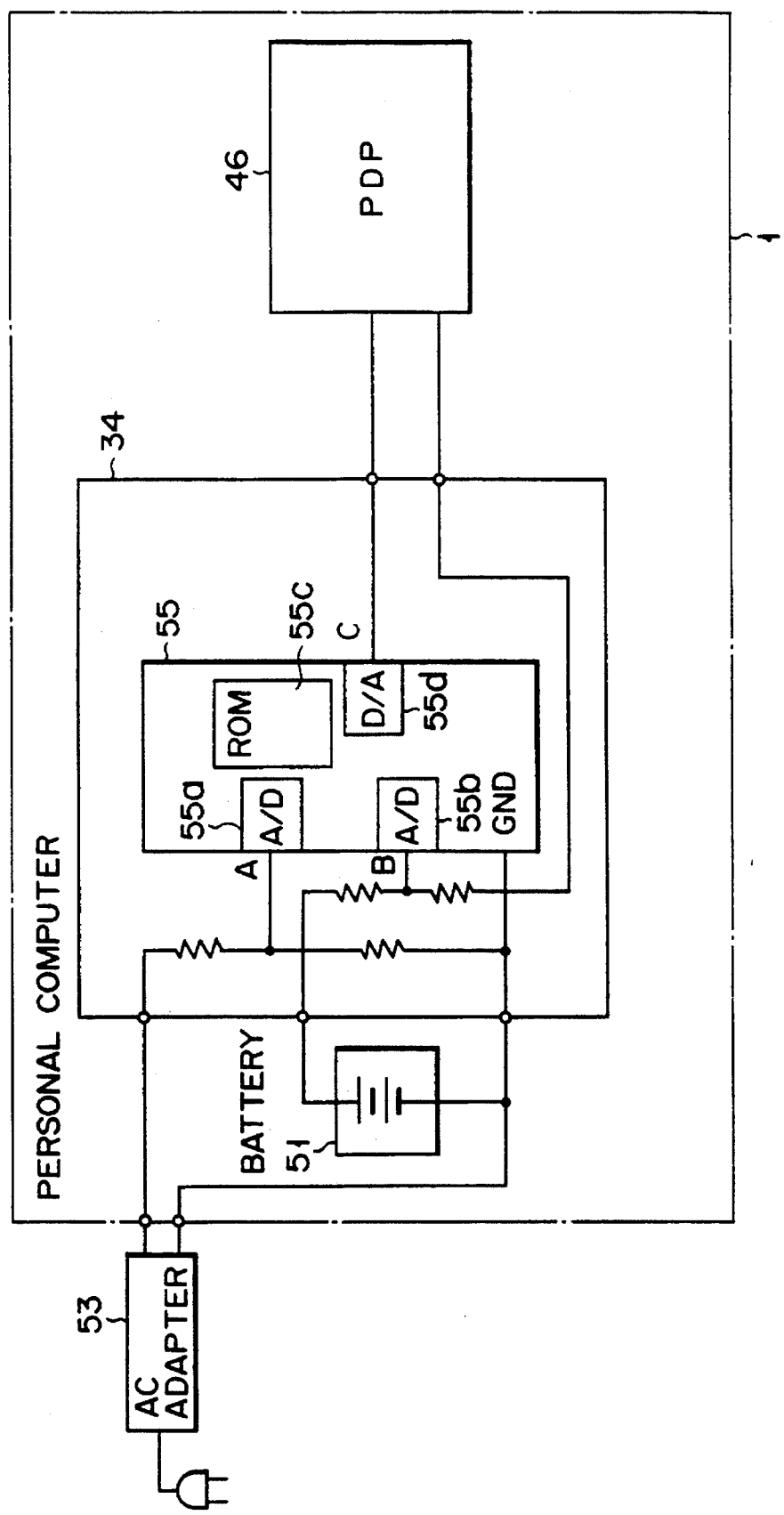
FIG. 2 is a block diagram showing a power supply unit as a main part of the embodiment shown in FIG. 1, and a PDP.

An embodiment of the present invention will now be described with reference to the drawings.

In FIG. 1, a CPU 11 comprises a 32-bit CPU chip, for example and controls the entire system. Internal buses 12 and 13 are connected to the CPU 11. An internal bus comprises an internal data bus 12 of 16-bit width and an internal address bus of 24-bit width. A numerical data processor 14 is optionally connected to the internal data bus 12 through a connector. A system bus 15 comprises a data bus 15D of 16-bit width, a lower address bus 15L of 20-bit width, and a higher address bus 15U of 7-bit width. A bus driver (BUS-DRY) 16 serves as an interface between the internal buses 12, 13 and the system bus 15. A bus controller (BUS-CONT) 17 controls the system bus 15. A memory controller (MEN-CNT) 18 controls transfer of addresses between the address buses 13–15 (U, L) to read/write controls the main memory 19.

A BIOS-ROM 20 stores BIOS (basic input and output system program). An I/O decoder (I/O-DEC) 21 decodes an I/O address on the system bus 15, and outputs it to a corresponding I/O element (chip). An I/O controller (I/O-CNT) 22 controls the input and output of the I/O data. A super integration IC (SI) 23 accommodates various I/O controllers such as a floppy disk interface, a hard disk interface, a DMA controller, and an interrupt controller. A frequency oscillator (VFO) 24 generates clock signals for floppy disk drive (FDD). A floppy disk interface (FDD-I/F) 25 and a hard disk interface (HDD-I/F) 26 interface the floppy disk and hard disk with the super integration 23, respectively. A keyboard controller (KBC) 27 is connected to the system bus 15, and a keyboard scan controller (SCC) 28 is connected to the keyboard controller 27. A backup RAM (B-RAM) 29 is used for the resume function. Extension memory cards (EXTM) 30 are optionally connected to the extension card connectors C1, C2, C3. A clock module (RTC: Real-Time Clock) 31 has a dedicated drive battery and a memory (CMOS-RAM) backed up by this battery. An input/output port (PRT/FDD-1F) 32 is provided for connecting an input/output device such as an external floppy disk drive (FDD) and a printer (PRT). RS-232C interface units are connected to the serial input/output interface (SIO) 33.

An intelligent power supply (PS) 34 is provided with a power control CPU (PC-CPU) 55 and supplies an operation power. The intelligent power supply 34 is connectable to a battery 51 and an AC adapter 53, and controls various operation power sources under the control of the power control CPU (PC-CPU) 55. The conditions of each power supply are notified to the CPU 11 through an I/O controller 22. The display controller (DISP-CONT) 35 serves as a display subsystem in the apparatus. That is, the controller 35 drives a flat panel display such as a plasma display (hereinafter called PDP), a liquid crystal display (hereinafter called LCD), and a color panel (color LCD, color PDP, etc.), and a CRT display (hereinafter called CRT). Various extension modules such as a display controller (display subsystem) can be connected to an extension connector 36. A floppy disk drive 41 is incorporated in the portable personal computer and connected to the floppy disk drive interface 25. A hard disk drive (HDD) 42 is connected to the hard disk drive interface 26. A keyboard unit (KB) 43 is connected to the keyboard scan controller 28. The scan controller 28 is further connected to a numeric key pad 44. Each of the back-lit LCD 45, PDP 46 and CRT 47 is connected to the display controller 35. A flat-panel display connector C10 is connected to the display controller 35. The connector C11 of LCD 45 or the connector C12 of PDP 46 is connected to the flat panel display connector C10. Two specific pins are assigned to the connector C10 for receiving signals for discriminating connected flat panel display. The discriminating signals are read in the CPU 11 through the I/O register provided in the display controller 35.

FIG. 2 is a block diagram showing the power supply unit 34 and PDP 46, a main part of the embodiment shown in FIG. 1. The personal computer 1 which can be driven by battery has a plasma display (PDP) 46 as a display unit. The PDP 46 can be driven by the built-in battery 51 or an externally connected AC adapter 53. The PDP 46 is of a DC type PDP whose luminance is controllable. The personal computer 1 uses the output voltage of the AC adapter 53 when the adapter 53 is connected and does not use the battery. The AC adapter 53 sends the power supply voltage converted from the commercial AC voltage to the DC voltage into the personal computer body 1. The power supply unit 34 generates each driving voltage of the personal computer 1 from the output voltage of the battery 51 or AC adapter 53. The PDP 46 displays data such as characters and graphics. The PDP 46 further has a function of changing the display luminance in response to the luminance control signal outputted from the power supply unit 34. The battery 51 is built in the personal computer 1 body and serves as a power supply when no AC adapter 53 is connected. The PC-CPU 55 is provided in the power supply unit 11, and outputs a luminance control signal. The output voltage from the AC adapter 53 is divided by voltage dividing resistors and supplied to the input terminal A of PC-CPU 55. The analog divided voltage supplied to an input terminal A is converted into digital value by the built-in first A/D converter 55a. The output voltage from the battery 51 is divided by voltage dividing resistors and supplied to an input terminal B of the PC-CPU 55. The PC-CPU 55 converts the digital value into an analog value by the built-in D/A converter 55d, and supplies an analog luminance control signal to PDP 46 through the output terminal C. The PC-CPU 55 further has a ground terminal GND, and one output terminals of the AC adapter 53 and buttery 51 are connected to the ground terminal through the voltage dividing resistor, and the other output terminals are directly connected to the ground terminal. The PC-CPU 55 has a ROM 55c storing a firmware shown by the flowchart in FIG. 3.

Figure 3:
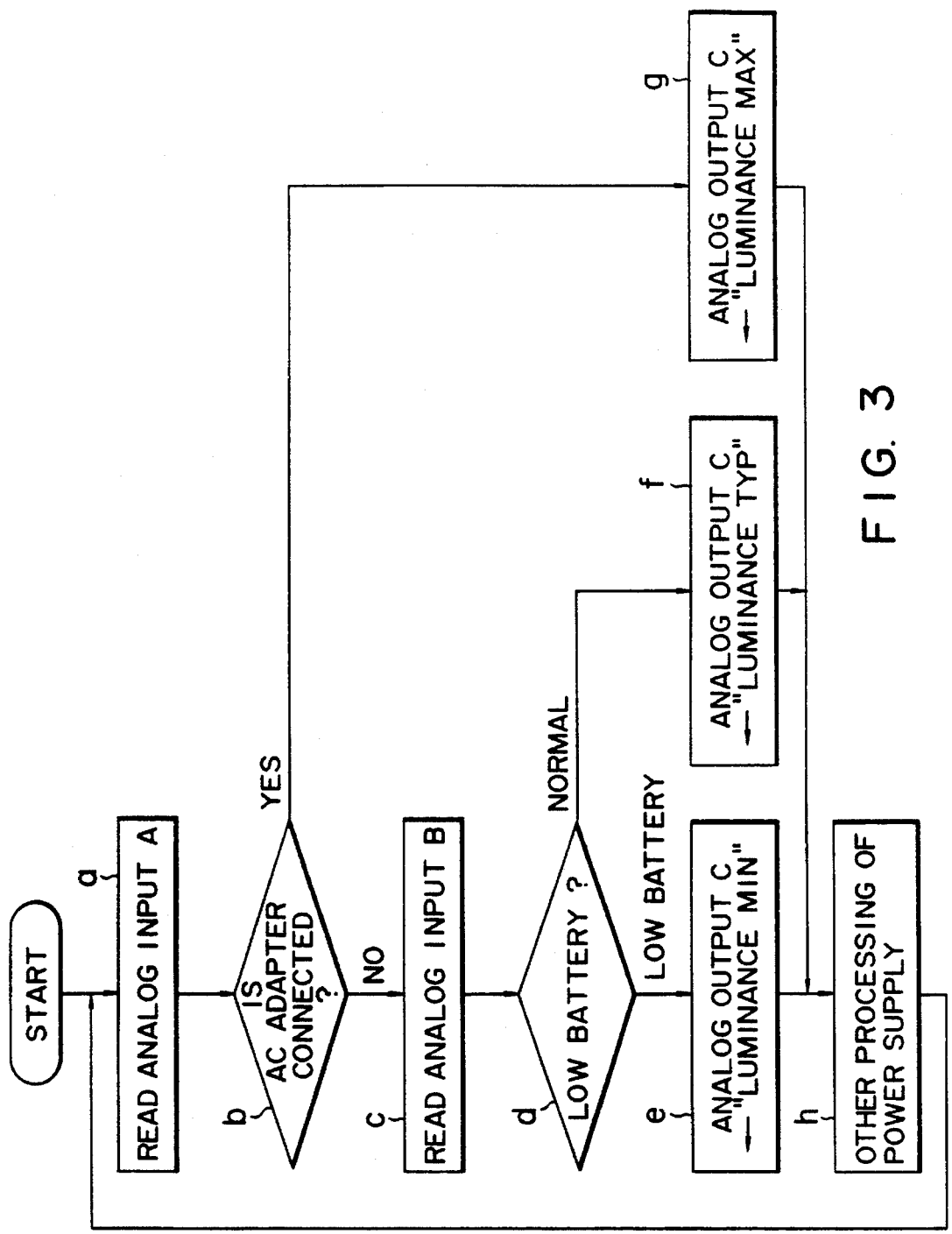
FIG. 3 is a flowchart showing an operation of a PC-CPU shown in FIG. 2.

An operation of the above embodiment will now be described with reference to FIGS. 1 to 3.

The PC-CPU 55 receives power from the AC adapter 53 and the battery 51 when the AC adapter 53 is connected, and when the AC adapter 53 is not connected, respectively. Thus, the PC-CPU 55 generates driving voltages such as 5 V and 12 V to be supplied to the respective units.

The PC-CPU 55 receives the voltage obtained by dividing the output voltage from the AC adapter 53 through an analog input terminal A. The PC-CPU 55 further receives the voltage obtained by dividing the output voltage from the battery 13 through the analog input terminal B. These voltage are analog values and converted into digital values by A/D converters 55a and 55b. The PC-CPU 55 outputs a luminance control signal from the analogue output terminal C. The signal outputted from the analog output terminal C is converted by the O/A converter 55d and then output as an analog value.

Upon receiving the luminance control signal, the PDP 46 displays data with the luminance corresponding to the voltage. The PDP 46 further includes a circuit which changes luminance depending on the current consumption. The luminance control input represents the display luminance when the display area on the screen is maximum and the maximum current flows. When the display area on the screen is small and small current flows, the luminance can be increased. This control is disclosed, for example, in Patent Application No. 60-21644 filed by the same assignee as the present invention. The above control is not directly related to the gist of the present invention and therefore the detailed description thereof will be omitted. The above control is performed either within the PDP or by the microcomputer incorporated in the power supply unit 34. The microcomputer detects the dissipated current for the PDP output from the power supply unit 34 and directly controls the luminance output.

As shown in U.S. Ser. No. 355,606 filed by the same applicant, the luminance control within the PDP 46 is performed by variably changing the pulse width of the modulated pulse. To decrease the luminance, the pulse width is shortened, and to increase the luminance, the pulse width is prolonged. In order to perform a gradation display as in U.S. Ser. No. 355,606, the pulse width is entirely changed.

A firmware processing will now be described with reference to FIG. 3. The PC-CPU 55 reads, in step a, the voltage input from the analog input terminal A as the digital data. In step b, if the PC-CPU 55 determines that the value is within the range of voltage of the AC adapter 2, the PC-CPU 55 outputs, step g, a voltage corresponding to "luminance MAX" to the analog output terminal C. If the PC-CPU 55 determines that the value is out of the range of the voltage of the AC adapter 2 (for example 0 V) and the AC adapter 2 is not connected, the PC-CPU 55 reads, in step c, the voltage input from the analog input terminal B as digital data. The PC-CPU 55 determines, in step d, if the value corresponds to the LOW battery (residual capacity of the battery is less than a certain value). When the residual capacity of the battery decreases, the voltage of the battery 51 drops as much, and the PC-CPU 55 determines if the voltage is less than the value corresponding to the LOW battery. This determination is performed, for example, according to the method disclosed in U.S. Pat. No. 4,849,700. If the voltage is higher than the value corresponding to LOW battery, the PC-CPU 55 determines "not LOW battery" and outputs, in step f, voltage corresponding to "luminance TYP" to the analog output terminal C. If the voltage is lower than the value corresponding to LOW battery, the PC-CPU 55 determines LOW battery, and output, in step e, a voltage corresponding to "Luminance MIN" to the analog output terminal C. The voltages output to the analog output terminal C in step e to g, are changed depending upon the luminance control data which the PC-CPU 55 outputs to the PDP 46. The respective voltages are defined as follows:

"luminance MAX": A voltage corresponding to the maximum luminance with the heat not exceeding a certain value. (2 V for example) The power consumption of the battery 51 need not be considered, since the AC adapter 53 is connected and the battery 51 is not used.

"luminance TYP": The battery 51 is being used. The luminance should be controlled lower to constrain the power consumption. A voltage corresponding to the luminance. (1 V for example)

"luminance MIN": The power consumption is increased depending upon the quantity of display on the screen. If the battery 51 is being used and the residual capacity of the battery is small, an abrupt increase of dissipating current such as quick reverse display by application program will cause the battery current to flow abruptly. For this reason, the shutdown operation may be performed in fail due to use up of battery power. For this reason, when the battery becomes in low battery state, it is necessary to secure the current so that the shutdown operation can be made even if the inverted display is made abruptly, by uniformly decreasing the display luminance. The voltage corresponding to the decreased luminance. (0.5 V, for example).

Then, the PC-CPU 55 performs other processings for the power supply unit and returns to step a. The loop is repeated until the battery is used up and the power supply fails to work.

Note that in the above embodiment only the luminance control for a DC type PDP has been described, but the similar control is possible for the back-lit LCD. However, in the back-lit LCD, the current consumption is not changed depending on the quantity of display on the screen. Accordingly, the luminance control when the quick reverse display is made by an application program need not be considered.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer supplied with power from a battery, comprising:

a flat panel display unit having a display screen for displaying images in a plurality of brightness levels;

determining means for determining whether an output voltage of the battery is less than a predetermined value; and control means for supplying to the flat panel display unit a first control signal for setting the display screen to a first brightness level when the determining means determines that the output voltage is less than the predetermined value, and for supplying to the flat panel display unit a second control signal for setting the display screen to a second brightness level higher than the first brightness level when the determining means determines that the output voltage is not less than the predetermined value.

2. A computer supplied with power from a battery or an external power source, comprising:

a flat panel display unit having a display screen for displaying images in a plurality of brightness levels;

determining means for determining whether the power is supplied to the flat panel display unit from the battery or the external power source; and control means for supplying to the flat panel display unit a first control signal for setting the display screen to a first brightness level when the determining means determines that the power is supplied from the battery, and for supplying to the flat panel display unit a second control signal for setting the display screen to a second brightness level higher than the first brightness level when the determining means determines that the power is supplied from the external power source.

3. A computer supplied with power from a battery, comprising:

a flat panel display unit having a display screen for displaying images in a plurality of brightness levels; and a controller, automatically controlling the brightness levels, including determining means for determining whether an output voltage of the battery is less than a predetermined value, the controller supplying to the flat panel display unit a first control signal for setting the display screen to a first brightness level when the determining means determines that the output voltage is less than the predetermined value, and supplying to the flat panel display unit a second control signal for setting the display screen to a second brightness level higher than the first brightness level when the determining means determines that the output voltage is not less than the predetermined value.

4. A computer supplied with power from a battery or an external power source, comprising:

a flat panel display unit having a display screen for displaying images in a plurality of brightness levels; and a controller, automatically controlling the brightness levels, including determining means for determining whether the power is supplied to the flat panel display unit from the battery or the external power source, the controller supplying to the display unit a first control signal for setting the display screen to a first brightness level when the determining means determines that the power is supplied from the battery, and for supplying to the flat panel display unit a second control signal for setting the display screen to a second brightness level higher than the first brightness level when the determining means determines that the power is supplied from the external power source.

5. A computer supplied with power from a battery, comprising:

a flat panel display unit including a liquid crystal display and a backlight device for displaying images in a plurality of brightness levels; and a controller, automatically controlling the brightness levels, including determining means for determining whether an output voltage of the battery is less than a predetermined value, the controller supplying to the backlight device a first control signal for setting the backlight device to a first brightness level when the determining means determines that the output voltage is less than the predetermined value, and supplying to the backlight device a second control signal for setting the backlight device to a second brightness level higher than the first brightness level when the determining means determines that the output voltage is not less than the predetermined value.

6. A computer supplied with power from a battery or an external power source, comprising:

a flat panel display unit having a liquid crystal display and a backlight device for displaying images in a plurality of brightness levels; and a controller, automatically controlling the brightness levels, including determining means for determining whether the power is supplied to the display unit from the battery or the external power source, the controller supplying to the backlight device a first control signal for setting the backlight device to a first brightness level when the determining means determines that the power is supplied from the battery, and for supplying to the backlight device a second control signal for setting the backlight device to a second brightness level higher than the first brightness level when the determining means determines that the power is supplied from the external power source.

7. A computer supplied with power from a battery, comprising:

a flat panel display unit having a liquid crystal display and a backlight device for displaying images in a plurality of brightness levels;

determining means for determining an output voltage of the battery; and control means for supplying to the backlight device a first control signal for setting the backlight device to a first brightness level when the determining means determines that the output voltage is a predetermined value or less, and for supplying to the backlight device a second control signal for setting the backlight device to a second brightness level higher than the first brightness level when the determining means determines that the output voltage is more than the predetermined value.

8. A computer supplied with power from a battery or an external power source, comprising:

a flat panel display unit having a liquid crystal display and a backlight device for displaying images in a plurality of brightness levels;

determining means for determining whether the power is supplied to the display unit from the battery or the external power source; and control means for supplying to the backlight device a first control signal for setting the backlight device to a first brightness level when the determining means determines that the power is supplied from the battery, and for supplying to the backlight device a second control signal for setting the backlight device to a second brightness level higher than the first brightness level when the determining means determines that the power is supplied from the external power source.

* * * * *